United States Patent
Nakagawa et al.

(10) Patent No.: US 6,959,671 B2
(45) Date of Patent: Nov. 1, 2005

(54) COOLING SYSTEM FOR WORK MACHINE

(75) Inventors: Tomohiro Nakagawa, Hirakata (JP); Shigeru Yamamoto, Hirakata (JP); Mitsuhiko Kamado, Hirakata (JP)

(73) Assignee: Komatsu Ltd., Tokyo (JP)

( * ) Notice: Subject to any disclaimer, the term of this patent is extended or adjusted under 35 U.S.C. 154(b) by 61 days.

(21) Appl. No.: 10/785,532

(22) Filed: Feb. 23, 2004

(65) Prior Publication Data

US 2005/0183417 A1 Aug. 25, 2005

(30) Foreign Application Priority Data

Feb. 19, 2004 (JP) ............................. 2004-043382

(51) Int. Cl.[7] .............................................. F01P 7/10
(52) U.S. Cl. .............................. 123/41.49; 123/41.12; 60/493
(58) Field of Search .................... 123/41.11, 41.12, 123/41.48, 41.49; 165/41, 51; 60/493

(56) References Cited

U.S. PATENT DOCUMENTS

| | | |
|---|---|---|
| 5,165,377 A | 11/1992 | Hosseini |
| 6,076,488 A | 6/2000 | Yamagishi |
| 6,286,308 B1 | 9/2001 | Yoshida et al. |
| 6,311,488 B1 | 11/2001 | Maruta et al. |
| 6,349,882 B1 | 2/2002 | Kita et al. |
| 6,481,388 B1 | 11/2002 | Yamamoto |

FOREIGN PATENT DOCUMENTS

| | | |
|---|---|---|
| JP | 10-068142 A | 3/1998 |
| JP | 11-193719 A | 7/1999 |

*Primary Examiner*—Noah P. Kamen
(74) *Attorney, Agent, or Firm*—Frishauf, Holtz, Goodman & Chick, P.C.

(57) ABSTRACT

A cooling system for use in a work machine is provided, in which an increase in the load imposed on a fan driving circuit and occurrence of abnormal noise can be prevented without fail by means of an inexpensive arrangement at the time of switching the rotating direction of a cooling fan. To this end, the cooling system comprises: (1) a variable displacement hydraulic pump driven by the engine; (2) a forwardly and reversely rotatable hydraulic motor operated by hydraulic oil supplied from the hydraulic pump; (3) a cooling fan driven by the hydraulic motor; (4) an electromagnetic selector valve for switching the rotating direction of the hydraulic motor between a forward direction and a reverse direction; (5) controlling means for controlling switching of the electromagnetic selector valve and controlling the hydraulic pump so as to minimize the discharge oil rate of the hydraulic pump during switching of the electromagnetic selector valve.

4 Claims, 5 Drawing Sheets

COOLING SYSTEM FOR WORK MACHINE

TECHNICAL FIELD

The present invention relates to a cooling system for use in a work machine such as a bulldozer or hydraulic excavator, the system having a radiator for cooling a coolant for the engine and a cooling fan for forcibly cooling the radiator.

BACKGROUND ART

In typical cooling systems for cooling the engine or the like of a work machine, a cooling fan is driven by an electric or hydraulic motor and the rotational speed of the cooling fan is controlled independently of the control of the rotation of the engine. One example of such cooling systems is disclosed in Japanese Kokai Patent Publication No. 10-68142.

As shown in FIG. 5, the cooling system disclosed in Japanese Kokai Patent Publication No. 10-68142 includes a radiator 52 and an oil cooler 53 which are disposed separately from an engine 51; a cooling fan 54 for forcibly cooling the radiator 52 and the oil cooler 53; and a fan driving circuit 55 for forwardly or reversely rotating the cooling fan 54 or stopping the rotation of it. The fan driving circuit 55 has a hydraulic pump 56 rotated by the engine 51; a forwardly and reversely rotatable hydraulic motor 57 operated by hydraulic oil supplied from the hydraulic pump 56; and an electromagnetic selector valve 60 interposed in a hydraulic pipe line 59 for connecting the hydraulic pump 56 and a tank 58 to the two ports of the hydraulic motor 57. Switching of the electromagnetic selector valve 60 is controlled by a control unit 64 based on detection data from an air temperature probe 61, a coolant temperature sensor 62 and an hydraulic oil temperature sensor 63. In a case where the temperature of air, the temperature of the coolant and the temperature of the hydraulic oil are lower than their settings at the time of starting up the engine, the controller 64 keeps the cooling fan stopped even if the engine starts up. If the temperature of the coolant rises to its setting or higher while the temperature of the hydraulic oil remains lower than its setting, the controller 64 controls the cooling fan 54 to reversely rotate, thereby warming the hydraulic oil within the oil cooler 53 by warm air which has passed through the radiator 52 and removing dust caught in the radiator 52 and others by a reverse current of air. If the temperature of the coolant and the temperature of the hydraulic oil both rise to their respective settings or higher, the controller 64 controls the cooling fan 54 to forwardly rotate, thereby cooling both the coolant and hydraulic oil. With this arrangement, the time required for warm up driving of the hydraulic equipment is reduced and improved cooling efficiency is achieved by removal of dust caught in the radiator 52 and the oil cooler 53.

Another cooling system similar to the above is disclosed in Japanese Kokai Patent Publication No. 11-193719. The cooling system of Japanese Kokai Patent Publication No. 11-193719 is such that a first driven state wherein the cooling fan is forwardly rotated for a first set period to cool the radiator and a second driven state wherein the cooling fan is reversely driven for a second set period to carry out dust removal from the radiator are regarded as one interval and this interval is repeated. In this system, if the temperature of the coolant is higher than its setting, the second driven state is maintained for a third set period whereby the dust catching net is prevented from being clogged before the performance of cooling the engine drops.

The above-described prior art systems have revealed the problem that the rotating direction of the cooling fan is sometimes switched while the cooling fan is rotating at high speed and this may cause a peak pressure in the fan driving circuit resulting in an increase in the load imposed on the driving circuit and occurrence of abnormal noise. In addition, a switchover spool (selector valve) having a neutral position is necessary for changing the rotating direction of the cooling fan during high-speed rotation, which unavoidably entails an increase in the cost of the system.

The invention is directed to overcoming these problems and a primary object of the invention is therefore to provide a cooling system for use in a work machine, in which an increase in the load imposed on the fan driving circuit and occurrence of abnormal noise can be prevented without fail by means of an inexpensive arrangement, at the time of switching the rotating direction of the cooling fan.

DISCLOSURE OF THE INVENTION

The above object can be accomplished by a cooling system for a work machine according to the invention, which comprises a radiator for cooling a coolant for an engine and a cooling fan for forcibly cooling the radiator, the system further comprising: (1) a variable displacement hydraulic pump driven by the engine; (2) a forwardly and reversely rotatable hydraulic motor operated by hydraulic oil discharged from the hydraulic pump; (3) a cooling fan driven by the hydraulic motor; (4) a selector valve for switching the rotating direction of the hydraulic motor between a forward direction and a reverse direction; and (5) controlling means for controlling switching of the selector valve and controlling the hydraulic pump so as to minimize the discharge oil rate of the hydraulic pump during switching of the selector valve.

According to the invention, the discharge oil rate of the hydraulic pump is controlled to be minimized in order to remove dust caught in the radiator when the selector valve is operated to change the rotating direction of the hydraulic motor from a forward direction to a reverse direction or vice versa. Therefore, occurrence of peak pressure in the hydraulic circuit for driving the cooling fan can be avoided, thereby restraining the increase of the load imposed on the hydraulic circuit and preventing occurrence of abnormal noise. In addition, since the discharge oil rate of the hydraulic pump can be restricted, a two position valve can be used as the selector valve, which leads to cost reduction. Further, since the discharge oil rate of the variable displacement hydraulic pump is properly controlled, waste of energy can be reduced compared to the system using a fixed displacement hydraulic pump, so that removal of dust from the radiator can be effectively carried out.

In the invention, the controlling means preferably controls the selector valve so as to change the rotating direction of the hydraulic motor from the forward direction to the reverse direction based on enumeration data from an operating time meter for counting the operating time of the work machine. With this arrangement, the operation of reversing the rotation of the hydraulic motor can be reliably carried out even if reversing interval is long. Further, the reverse rotation can be performed without use of an expensive special device, using an operating time meter that is usually equipped for ordinary work machines. This contributes to cost reduction.

The driving time of the hydraulic motor in the forward direction and the driving time of the hydraulic motor in the reverse direction are preferably settable by time setting means. With this arrangement, the forward and reverse rotation times can be set in compliance with the condition of the operation site where the work machine is used, which makes it possible to achieve a system enhanced in convenience.

BEST MODE FOR CARRYING OUT THE INVENTION

Referring now to the accompanying drawings, a cooling system for a work machine will be concretely described according to a preferred embodiment of the invention.

Figure 1:
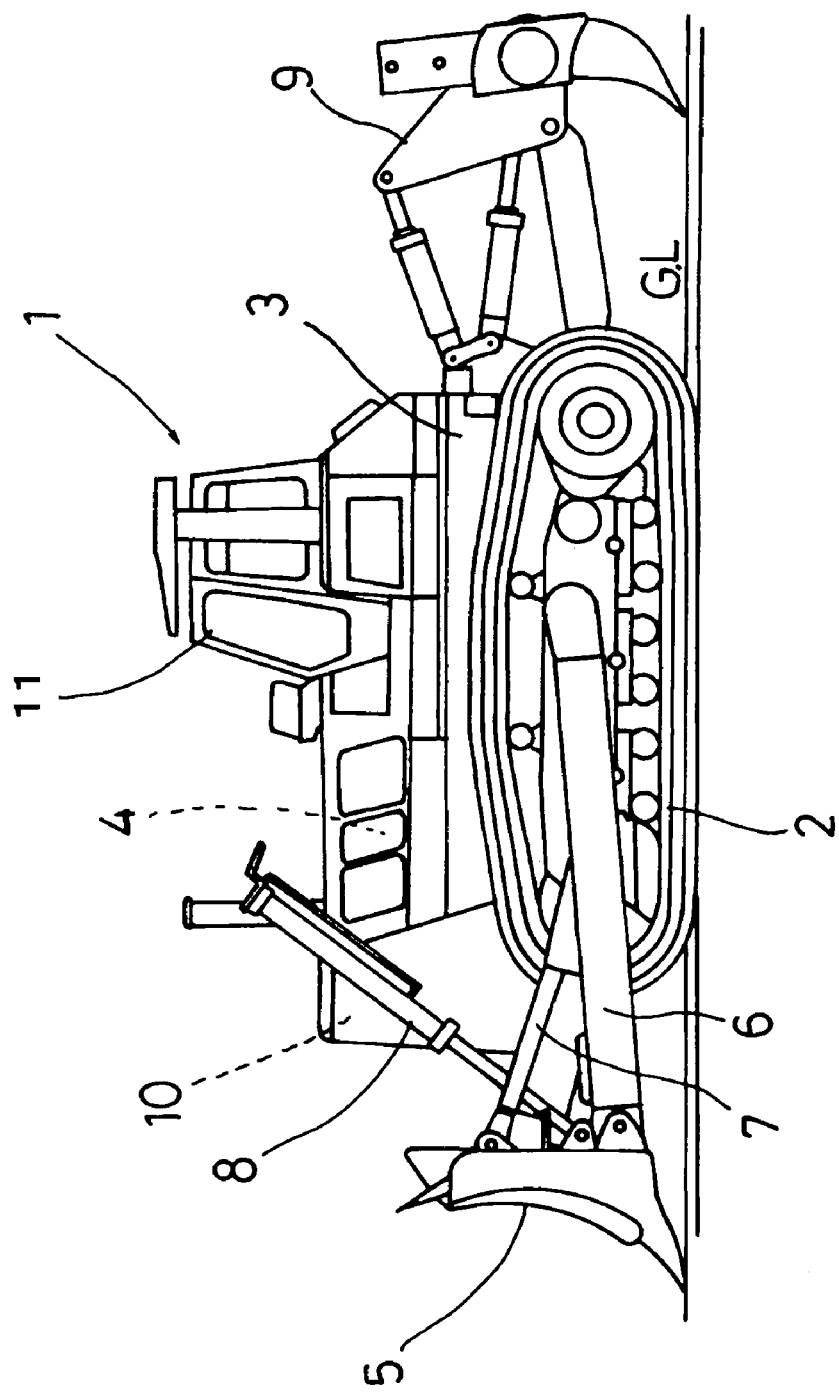
FIG. 1 is a schematic side view of a bulldozer according to an embodiment of the invention.
Figure 2:
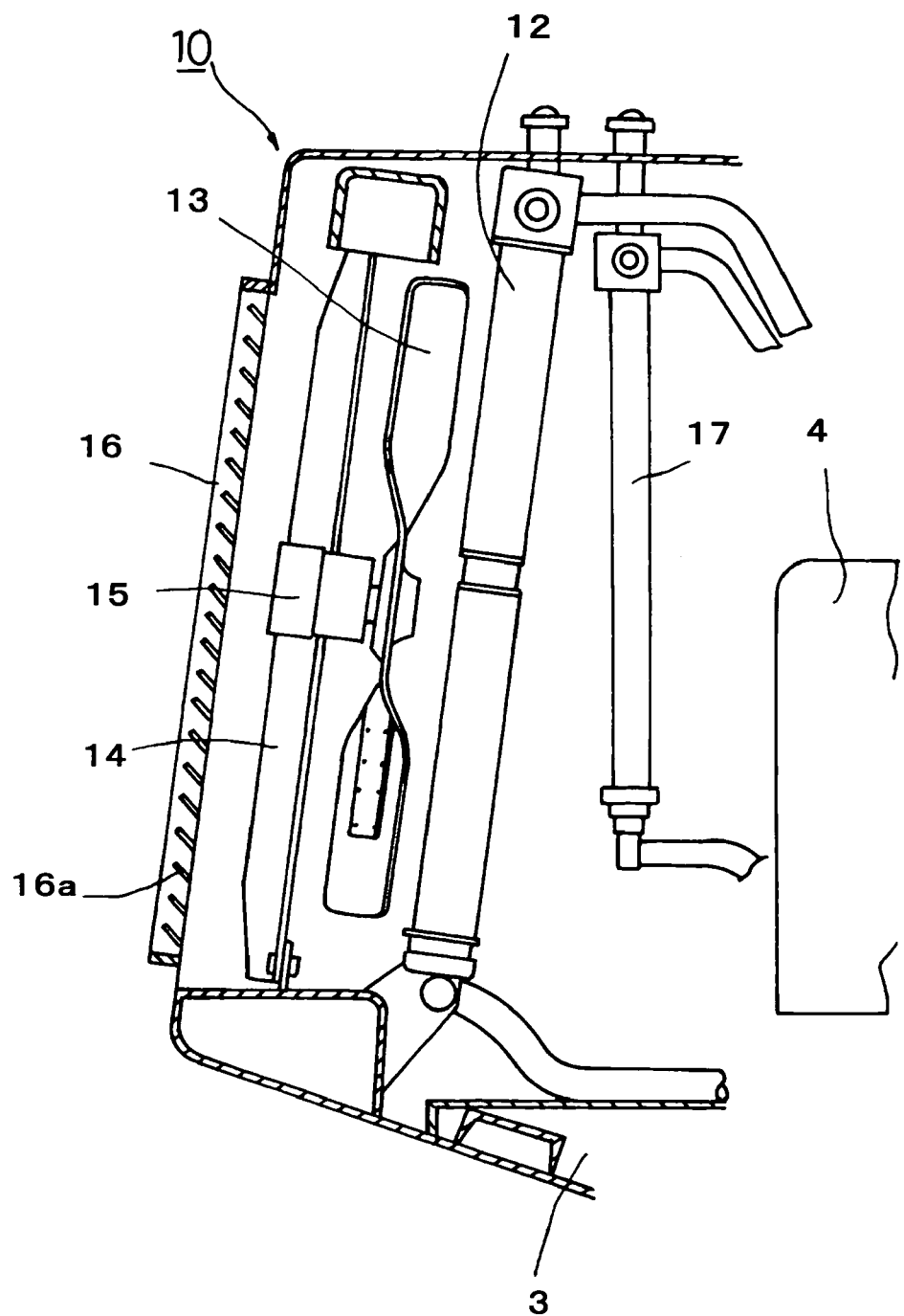
FIG. 2 is a schematic structural diagram of a cooling system incorporated in the bulldozer according to the embodiment.

FIG. 1 shows a schematic side view of a bulldozer according to one embodiment of the invention. FIG. 2 is a schematic structural diagram of a cooling system incorporated in the bulldozer according to the embodiment.

In a bulldozer 1 of this embodiment, an engine 4 is mounted on an upper front part of a vehicle body 3 equipped with a track-type machine undercarriage 2 as shown in FIG. 1. Placed in front of the engine 4 is a cooling system 10 for cooling the engine 4. At a position in front of the vehicle body 3, a blade 5 is supported by frames 6 at its right and left sides so as to be operable by a tilt cylinder 7 and a lift cylinder 8. A ripper 9 is disposed behind the vehicle body 3 and an operator's cab 11 is provided at a central position slightly closer to the rear.

As shown in FIG. 2, the cooling system 10 includes a radiator 12 for cooling a coolant for the engine 4 and a cooling fan 13 driven independently of the rotation of the engine 4 for sending cooling air to the radiator 12. The radiator 12 is inclined at a desired elevation angle with respect to the ground GL. The cooling fan 13 is located in front of the radiator 12, being a specified distance away from the radiator 12. The cooling fan 13 is directly connected to the output shaft of a hydraulic motor 15 fixedly mounted on a substantial center of a frame 14 formed in front of the radiator 12. The cooling fan 13 is disposed in parallel with the inclined surface of the radiator 12. A radiator grill 16 is disposed at the front edge of the vehicle body 3 so as to incline at the same angle as the radiator 12. A louver 16a is formed over the entire surface of the radiator grill 16, being composed of diagonally slanting pieces aligned at specified intervals. Reference numeral 17 designates a sub radiator.

In the cooling system 10 of this embodiment having the above-described structure, since the cooling fan 13 for cooling the radiator 12 is located in front of the radiator 12, air suctioned by negative pressure generated by the rotation of the cooling fan 13 passes through the radiator 12 positioned at the back, thereby making heat exchange.

Figure 3:
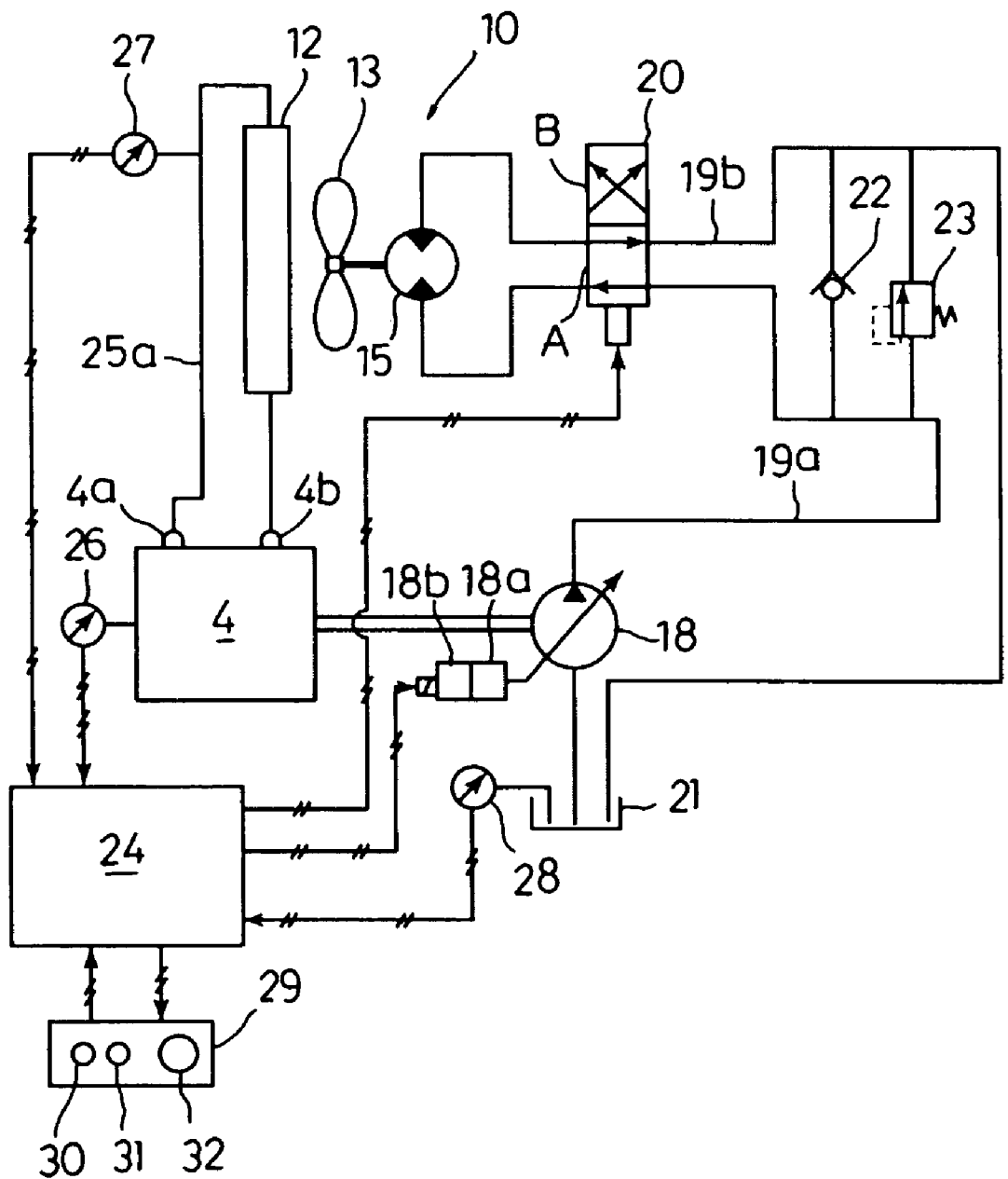
FIG. 3 is a circuit diagram of a cooling fan driving system incorporated in the cooling system of the embodiment.

Reference is made to FIG. 3 to describe a driving system for the cooling fan 13 incorporated in the cooling system 10 of this embodiment.

As shown in FIG. 3, this driving system is provided with a variable displacement hydraulic pump 18 operated by the engine 4. Pressure oil discharged from the hydraulic pump 18 flows, by way of a pipe line 19a, into the inlet port of an electromagnetic selector valve 20 consisting of a two position valve. Then, the pressure oil is fed from the outlet port of the electromagnetic selector valve 20 to the fixed displacement hydraulic motor 15. Attached to the output rotary shaft of the hydraulic motor 15 is the cooling fan 13. The return oil from the hydraulic motor 15 returns to a hydraulic oil tank 21 by way of the electromagnetic selector valve 20 and a pipe line 19b. Interposed between the pipe lines 19a and 19b are a check valve 22 and a relief valve 23. The check valve 22 is for circulating the oil from the hydraulic motor 15 rotated by inertia when the hydraulic pump 18 and the hydraulic motor 15 are stopped. The relief valve 23 is juxtaposed with the check valve 22.

The output capacity of the hydraulic pump 18 is controlled by actuation of a servo valve 18a so that its discharge rate is varied. The rotational speed of the cooling fan 13 is controlled by this variable discharge rate. Based on a control pressure from a pressure reducing valve of an implement circuit (not shown), an electromagnetic proportional valve 18b outputs a pilot pressure to a servo valve 18a in response to a current command value fed from a controller (controlling means) 24. Based on the pilot pressure, the servo valve 18a controls the tilt and rotation angle of the swash plate of the hydraulic pump 18.

The electromagnetic selector valve 20 is switched between Position A and Position B by a current command signal supplied from the controller 24, thereby controlling the output flow rate and direction of pressure oil and controlling the hydraulic motor 15, in other words, the cooling fan 13 to rotate in a forward or reverse direction.

On the other hand, a coolant from a water pump 4a of the engine 4 flows into the radiator 12 by way of a pipe line 25a and is then cooled by the radiator 12. Thereafter, the coolant passes through a pipe line 25b to return to a water jacket 4b of the engine 4.

The engine 4 is provided with an engine rotational speed detecting sensor 26 for detecting the rotational speed of the engine 4, and an inlet pipe line 25a of the radiator 12 is provided with a coolant temperature sensor 27 for detecting the temperature of the coolant for the engine 4. Detection signals from these sensors 26, 27 are input to the controller 24. A detection signal from a hydraulic oil temperature sensor 28 for detecting the temperature of the hydraulic oil is also input to the controller 24.

The controller 24 consists of a microcomputer including a central processing unit (CPU) for executing a specified program; a read-out memory (ROM) for storing the above program, various maps and others; a random access memory (RAM) serving as a working memory necessary for execution of the program and as registers for various data; and a timer for counting the time of each event in the program.

In the operator's cab 11, there are provided limiting switches (time setting means) 30, 31 for changing settings for the forward rotation time and reverse rotation time of the cooling fan 13 and a monitor panel 29 equipped with an operating time meter (service meter) 32 for displaying the operating time of the bulldozer 1. The data set thorough the monitor panel 29 is input to the controller 24.

Figure 4:
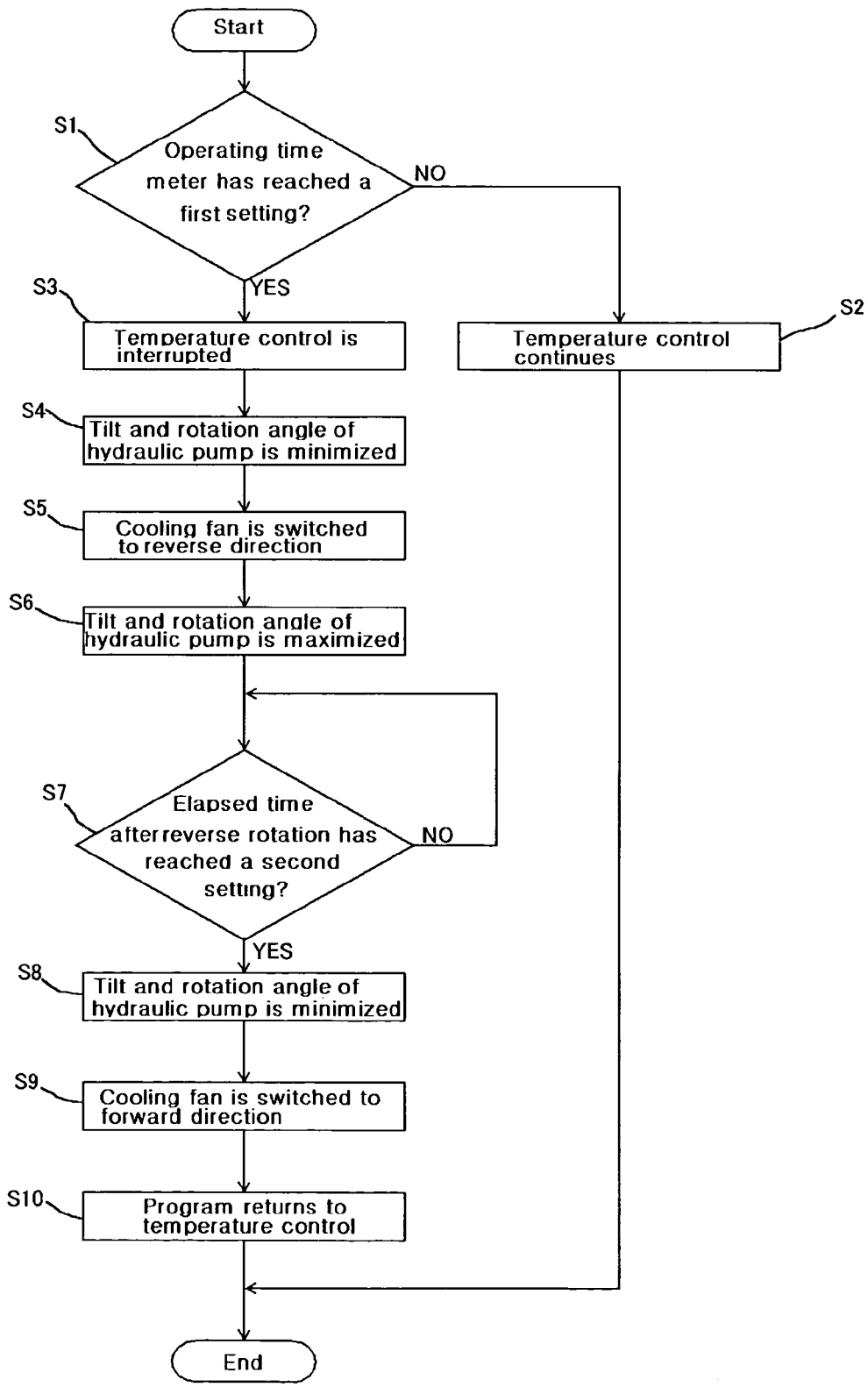
FIG. 4 is a flow chart showing an example of driving control of the cooling fan incorporated in the cooling system of the embodiment.
Figure 5:
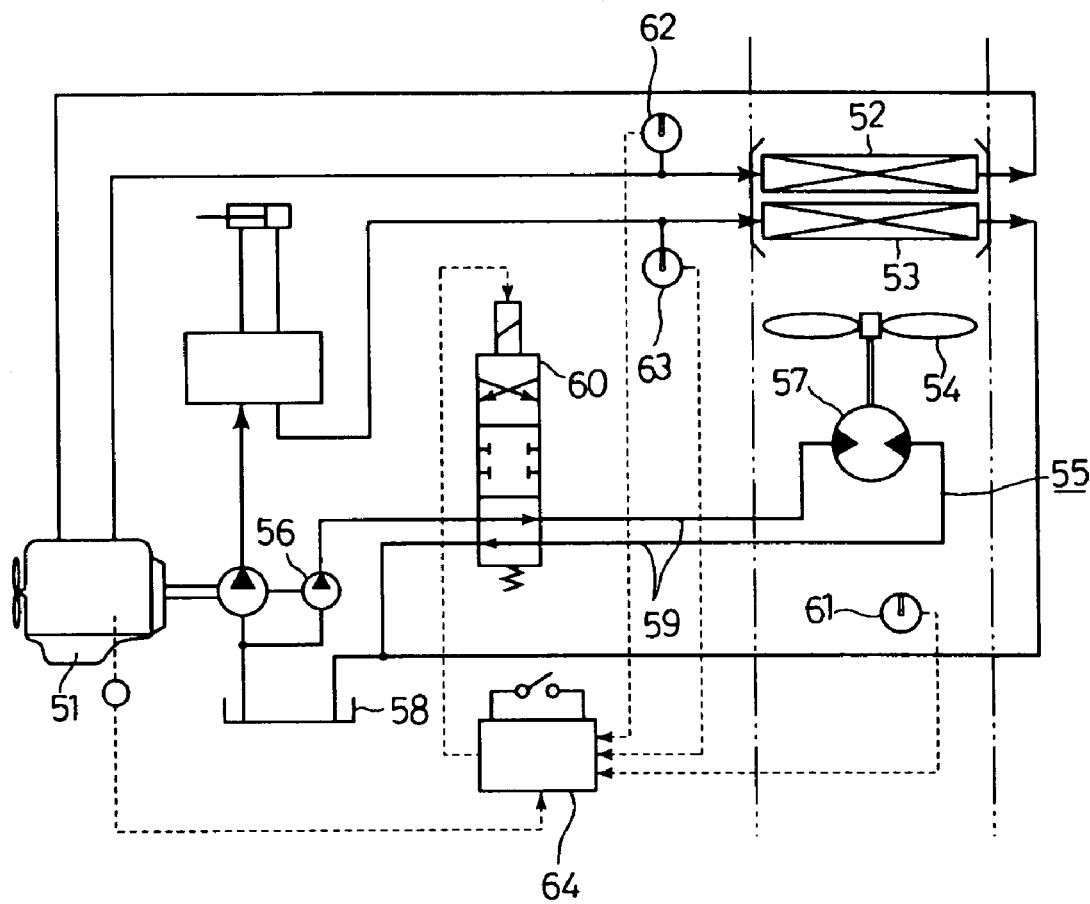
FIG. 5 is a circuit diagram of a cooling system according to a prior art technique.

With reference to the flow chart of FIG. 4, there will be explained an example of the driving control of the cooling fan 13 incorporated in the cooling system 10 of the present embodiment. It should be noted S1 to S10 represent Step 1 to Step 10.

S1 to S3: Although a detailed explanation is omitted herein, in the cooling system 10 of the present embodiment, the rotational speed of the cooling fan 13 actuated by the hydraulic pump 18 is continuously controlled according to the temperature of the coolant, the temperature of the hydraulic oil and the rotational speed of the engine (this is by the so-called temperature control). In the temperature control, a check is made to determine if the operating time of the bulldozer 1 counted by the operating time meter 32 has reached a first setting (e.g., one hour) which has been preset. If it has not reached the first setting, the temperature control continues and if it has reached the first setting, the temperature control is interrupted for removal of dust from the radiator 12.

S4 to S6: For preparation for reversing the rotation of the cooling fan 13, the controller 24 transmits a command signal to the electromagnetic proportional valve 18b to minimize the tilt and rotation angle of the swash plate of the hydraulic pump 18 so that the rotational speed of the cooling fan 13 is minimized. Then, a command signal is transmitted to the electromagnetic selector valve 20 to switch the electromagnetic selector valve 20, so that the rotating direction of the cooling fan 13 is switched from the forward direction to the reverse direction. While the cooling fan 13 is in its reversely rotating condition, a command signal is transmitted again to the electromagnetic proportional valve 18b to maximize the tilt and rotation angle of the swash plate of the hydraulic pump 18 so that the rotational speed of the cooling fan 13 is maximized. In this way, dust or the like caught in the radiator 12 is blown off by a reverse current of air. It should be noted that the time required for minimizing or maximizing the rotational speed of the cooling fan 13 is normally preset to about several seconds.

S7 to S9: A check is made to determine if the time elapsed after reversing the rotation of the cooling fan 13 has reached a second setting (e.g., six minutes) that has been preset. If it has reached the second setting, it is judged that dust removal operation has been finished and therefore the tilt and rotation angle of the swash plate of the hydraulic pump 18 is minimized like the step S4 to minimize the rotational speed of the cooling fan 13 thereby completing the dust removal operation. Subsequently, the electromagnetic selector valve 20 is switched, thereby changing the rotating direction of the cooling fan 13 from the reverse direction to the forward direction. Thereafter, the driving control routine for the cooling fan 13 is completed and the program returns to the normal temperature control. As a result, the operation of removing dust from the radiator 12 is completed and the normal driving is restored.

In the present embodiment, the settings (the first and second settings) for the forward rotation time and reverse rotation time of the cooling fan 13 are properly adjustable by the operator through the limiting switches 30, 31 of the monitor panel 29 provided in the operator's cab 11. Therefore, the operator can arbitrarily set the forward rotation time and reverse rotation time of the cooling fan 13 according to the condition of the working site where the bulldozer 1 is operated or according to the contents of the operation.

According to the present embodiment, since the discharge oil rate of the hydraulic pump 18 is controlled so as to be minimized when switching the rotating direction of the cooling fan 13 from the forward direction to the reverse direction or vice versa, occurrence of peak pressure in the hydraulic circuit for driving the cooling fan 13 can be avoided, thereby restraining the increase of the load imposed on the hydraulic circuit. As a result, occurrence of abnormal noise can be prevented without fail during the switching. In addition, since the timing of switching of the rotating direction of the cooling fan 13 from the forward direction to the reverse direction is determined based on data from the operating time meter, the reverse rotation of the hydraulic motor can be reliably carried out even if the reverse rotation interval is long and cost reduction can be achieved because there is no need to use a costly special device.

While the forgoing embodiment has been presented in terms of a bulldozer, it is obvious that the cooling system of the invention is applicable to other work machines.

What is claimed is:

1. A cooling system for a work machine, which comprises a radiator for cooling a coolant for an engine and a cooling fan for forcibly cooling the radiator, the system further comprising: (1) a variable displacement hydraulic pump driven by the engine; (2) a forwardly and reversely rotatable hydraulic motor operated by hydraulic oil discharged from the hydraulic pump; (3) a cooling fan driven by the hydraulic motor; (4) a selector valve for switching the rotating direction of the hydraulic motor between a forward direction and a reverse direction; and (5) controlling means for controlling switching of the selector valve and controlling the hydraulic pump so as to minimize the discharge oil rate of the hydraulic pump during switching of the selector valve.

2. The cooling system for a work machine according to claim 1, wherein the controlling means controls the selector valve so as to change the rotating direction of the hydraulic motor from the forward direction to the reverse direction based on enumeration data from an operating time meter for counting the operating time of the work machine.

3. The cooling system for a work machine according to claim 1, wherein the driving time of the hydraulic motor in the forward direction and the driving time of the hydraulic motor in the reverse direction are settable by time setting means.

4. The cooling system for a work machine according to claim 2, wherein the driving time of the hydraulic motor in the forward direction and the driving time of the hydraulic motor in the reverse direction are settable by time setting means.

* * * * *